(12) United States Patent
Chung

(10) Patent No.: US 12,356,899 B2
(45) Date of Patent: Jul. 15, 2025

(54) AUTOMATIC MECHANICAL SYSTEM IN MASS PRODUCTION INDOOR PLANTING WITH SOIL

(71) Applicant: Jing-Yau Chung, Houston, TX (US)

(72) Inventor: Jing-Yau Chung, Houston, TX (US)

( * ) Notice: Subject to any disclaimer, the term of this patent is extended or adjusted under 35 U.S.C. 154(b) by 119 days.

(21) Appl. No.: 18/160,183

(22) Filed: Jan. 26, 2023

(65) Prior Publication Data

US 2023/0232752 A1 Jul. 27, 2023

Related U.S. Application Data

(60) Provisional application No. 63/341,662, filed on May 13, 2022, provisional application No. 63/303,272, filed on Jan. 26, 2022.

(51) Int. Cl.
*A01G 9/14* (2006.01)
*A01G 9/029* (2018.01)

(52) U.S. Cl.
CPC ........... *A01G 9/143* (2013.01); *A01G 9/0299* (2018.02)

(58) Field of Classification Search
CPC .... A01G 9/143; A01G 9/0299; A01G 31/045; A01D 46/30
See application file for complete search history.

(56) References Cited

U.S. PATENT DOCUMENTS

| | | | | |
|---|---|---|---|---|
| 3,771,258 A * | 11/1973 | Charney | .............. | A01G 31/042 47/17 |
| 3,913,758 A | 10/1975 | Faircloth et al. | | |
| 5,253,745 A * | 10/1993 | van den Bergh | ....... | F25D 25/04 198/465.1 |
| 7,266,924 B2 * | 9/2007 | Van De Lande | .... | A01G 9/1423 47/62 R |
| 10,076,086 B2 * | 9/2018 | Daas | ...................... | A01G 9/088 |
| 2006/0218862 A1 | 10/2006 | Dyas | | |
| 2018/0367614 A1 | 12/2018 | Millar | | |
| 2019/0092567 A1 * | 3/2019 | Lawrence | .............. | B65G 1/026 |

FOREIGN PATENT DOCUMENTS

DE 3404300 A1 * 8/1985

OTHER PUBLICATIONS

NL_9401186_A_(Year: 1996).*
Rodriquez, Kari, PCT International Search Report for PCT/US23/61399, Jul. 18, 2023, 4 pages, ISA/US, Commissioner for Patents, Alexandria, Virginia, United States.

(Continued)

*Primary Examiner* — Joshua D Huson
*Assistant Examiner* — Edgar Reyes
(74) *Attorney, Agent, or Firm* — Oathout Law Firm; Mark A. Oathout

(57) ABSTRACT

A mass indoor production of vegetation system maintains a train in a stationary position on a rail system inside an indoor enclosure during a growing period of vegetation. The train has a plurality of plant-pots interconnected by a plurality of push-pull bars. Each of the plant-pots contains at least one plant. The train of the plant-pots may be moved on the rail system in either direction by pushing or pulling the plurality of push-pull bars. The plurality of plant-pots may be pulled out of the indoor enclosure during a time of harvesting the plant.

6 Claims, 14 Drawing Sheets

(56) References Cited

OTHER PUBLICATIONS

Rodriquez, Kari, PCT Written Opinion of the International Searching Authority for PCT/US23/61399, Jul. 18, 2023, 6 pages, ISA/US, Commissioner for Patents, Alexandria, Virginia, United States.
English Translation of DE 3404300 (published Aug. 8, 1985) as provided with the PCT International Search Report & PCT Written Opinion of the International Searching Authority for PCT/US23/61399 issued Jul. 18, 2023 by ISA/US, 8 pages.

* cited by examiner

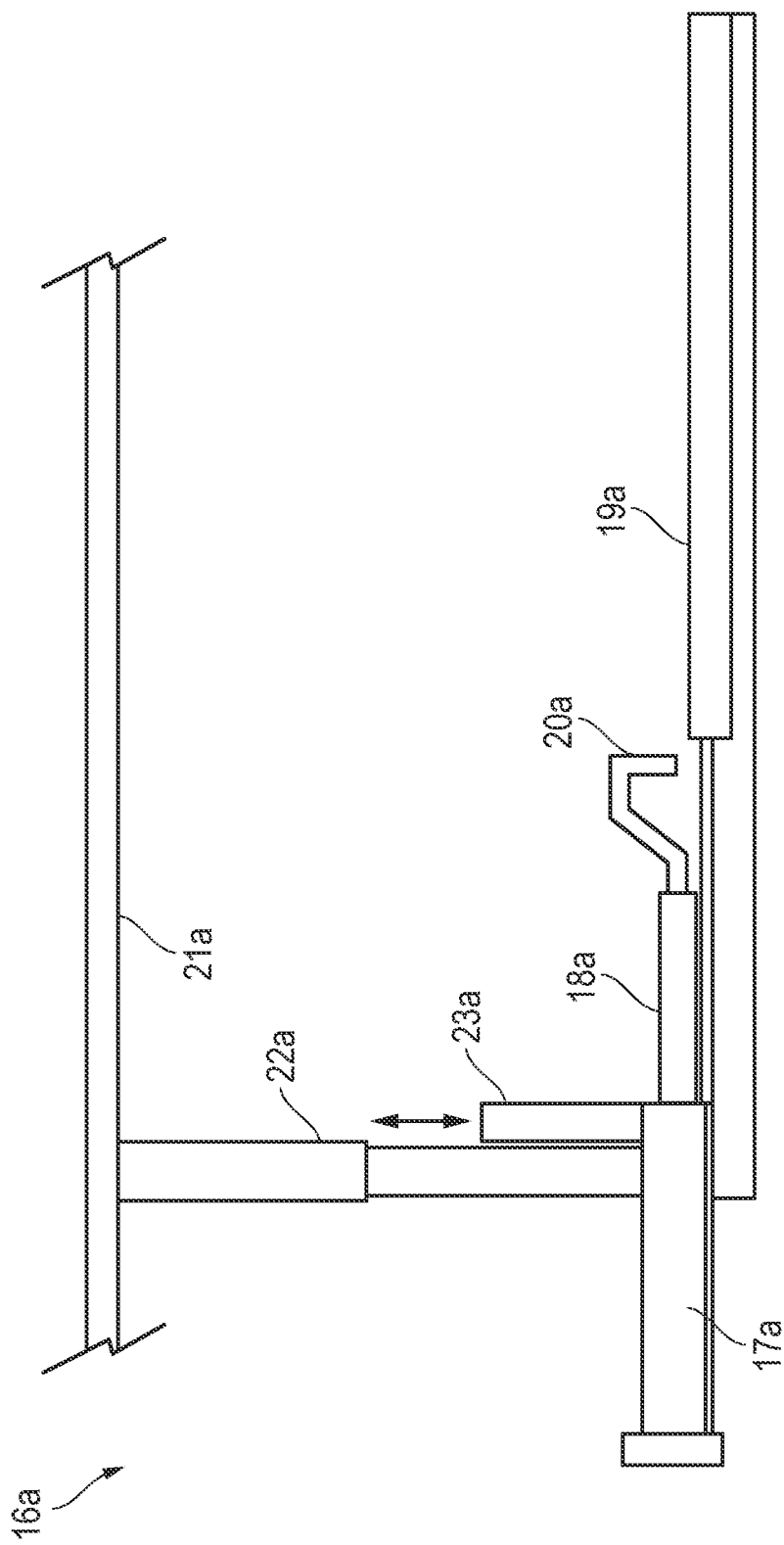

AUTOMATIC MECHANICAL SYSTEM IN MASS PRODUCTION INDOOR PLANTING WITH SOIL

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

Technical Field: The technical field is directed to mechanical devices and mechanisms for efficient indoor production of agriculture crop such as edamame pods.

SUMMARY

This present technology and at least one aspect of the invention is related to a series of new mechanical devices and mechanisms to be used in an efficient indoor planting, for example, planting edamame in a greenhouse, or mass indoor production of vegetation.

Indoor planting has some advantages listed below over the regular outdoor planting in the open field.

1. Planting can be made vertically with multiple vertical layers of vegetations to produce more crop than a single layer horizontal planting within the same given acreage of land. A flat farmland is not required for indoor planting.
2. Planting can be successful in different climate zones without being affected dominantly by the outdoor ambient temperature, humidity and rainfall.
3. Plants can be nourished with optimum lighting, moisture, fertilizer for optimum growth rate and no insecticide spray is needed for indoor planting.
4. Artificial lighting may be used to lengthen the daily light exposure of plants thus to increase the growth rate of some plants.
5. Plants are not subject to damages by extreme weather and flooding in particular.
6. Green house being built at any given location may be maintained at a special planting environment for a special variety of produce, fruit, flower or plant. For example, with proper control of the temperature, moisture and soil variety in the green house being built in Alaska a high-quality yam similar to some Japanese yams may be produced. It should be noted yams are normally grown in temperate to tropical regions.

Even with the abovementioned advantages, a large-scale indoor planting, however, has not been popular mainly due to the lacking of conventional farming tools for efficient indoor sowing, soil preparations, irrigation and even harvesting. In a traditional outdoor farming, tools have been available for varieties of farming procedures from sowing to the final harvesting. For example, different tools are available for the soil preparations alone which includes loosening of soil by a subsoiler, removing of weeds by a cultivator and leveling of soil by a tractor-pulled scraper. For a large-scale indoor planting of edamame, for example, with multiple vertical layers of edamame plants, the abovementioned conventional soil preparation and other cultivation processes are no longer valid. This present technology and at least one aspect of the invention describes a non-conventional method of a large-scale indoor planting using a new mechanical system to prepare planting soil or other soil substitutes, to sow, to nourish plants and to harvest the crop in an efficient manner.

BRIEF DESCRIPTION OF DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

FIG. 3A depicts a side elevational view of another exemplary programmable arm or smart arm.

DETAIL DESCRIPTION OF THE PREFERRED EMBODIMENTS OF THE INVENTION

The description that follows includes exemplary apparatus, methods, techniques, and instruction sequences that embody techniques of the inventive subject matter. However, it is understood that the described embodiments may be practiced without these specific details.

Plant-Pot on Rail

Figure 1:
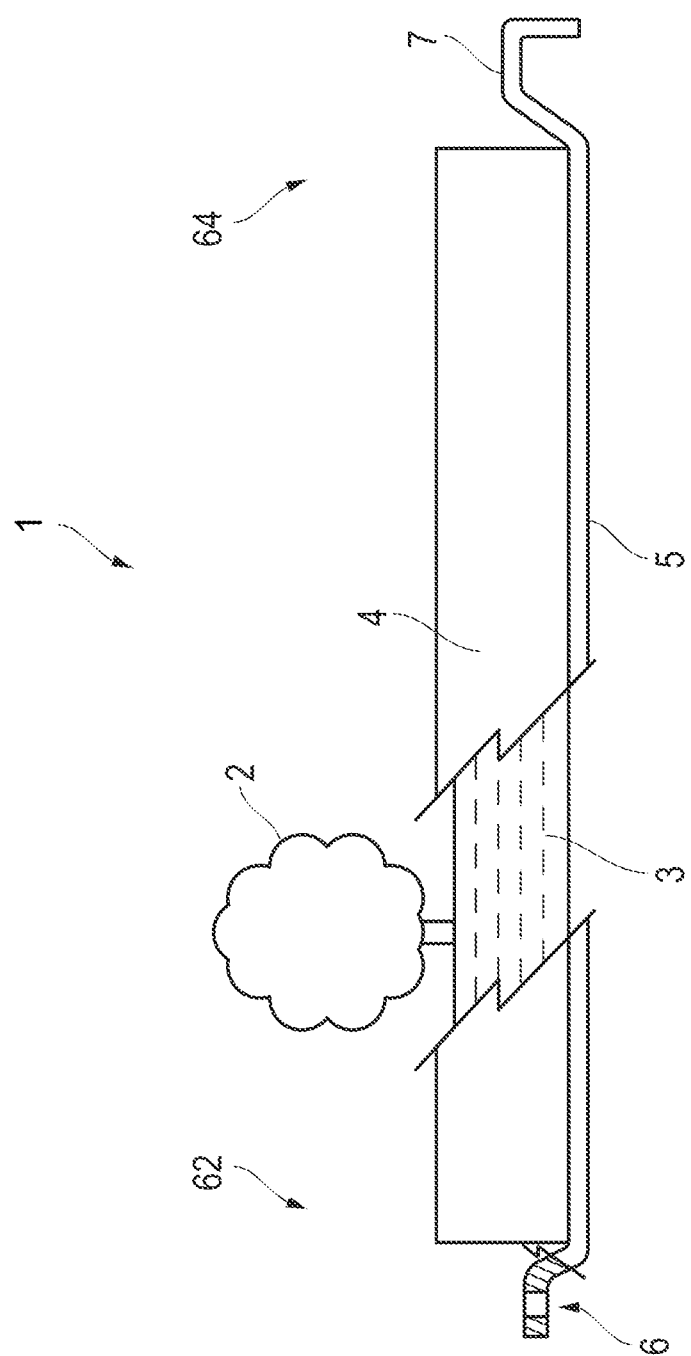
FIG. 1 depicts a side, partial break-away, elevation view of a plant-pot.

With reference to FIG. 1, the plant-pot 1 represents a pot for indoor planting of a plant or a multiple of plants, for example, a multiple of edamame plants to be planted in the pot. The plant may be in the nature of a crop for agricultural production and subsequent consumption, and/or use in subsequent products. Plant-pot 1 consists of four components or may comprise components, namely edamame plant 2, soil 3, pot 4 and push-pull bar 5. The push-pull bar 5 is fixed on the bottom of pot 4 having a bar-hole 6 at one end 62 of push-pull bar 5 and having a bar-hook 7 at the other end 64 of push-pull bar 5. The entire push-pull bar 5 can be made of, for example, a piece of flat iron or other rigid durable material. The bar-hook 7 is used to connect plant-pot 1 with the adjacent plant-pot by inserting bar-hook 7 in the bar-hole 6 of the adjacent plant-pot to form a linkage 60 for joining contiguous and aligned push-pull bars 5. When all plant-pots are connected in this manner, a train 52 of plant-pots is formed and such a train 52 of plant-pots can be either pushed or pulled through the push-pull bar causing the entire train of plant-pots to move in one direction or the other.

Figure 2:
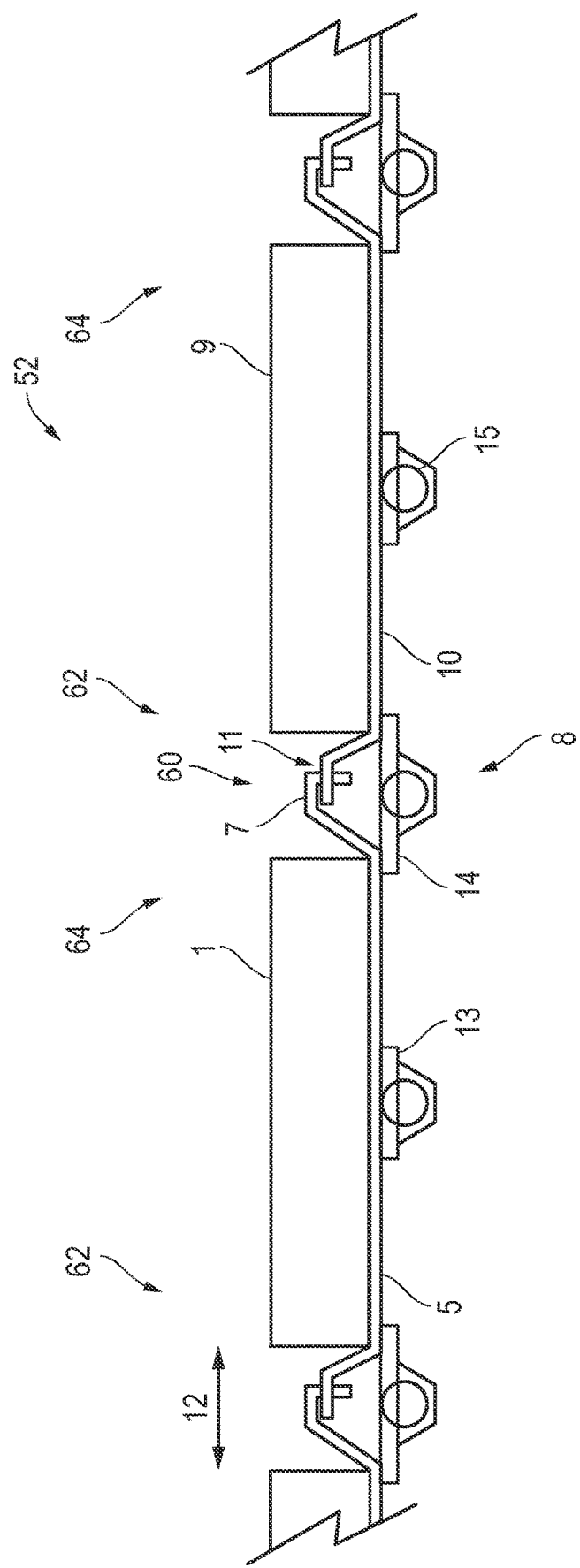
FIG. 2 depicts a side elevational view of a section of rail of rail system for one or more plant pots, which may be connected to form a train of plant pots.

FIG. 2 shows a section of rail 8 which supports the plant-pots. As depicted in FIG. 2, plant-pot 1 and the adjacent plant-pot 9 are connected through push-pull bar 5, having one end 62 and another end 64, and push-pull bar 10, having one end 62 and another end 64, by means of hook 7 which is inserted in hole 11 of push-bar 10 to form a linkage 60. Both plant-pot 1 and plant-pot 9 are either stationary or moving on rail or rail system 8. As mentioned above, all plant-pots are connected to form a train of plant-pots to be stationary or to be moved on rail 8 in the direction indicated by the arrow 12. By way of example only, a train 52 may remain stationary on a rail system 8 inside an indoor enclosure during a growing period of the plant(s) or vegetation.

Rail 8 represents the entire rail system which consists of or may comprise a number of rail-section 13 and a number of rail-section 14 constituting a piecewise continuous rail on which the train of plant-pots are rested. A roller 15 is installed in rail-section 13 and rail-section 14 such that the push-pull bar 5 and push-pull bar 10 can be riding on the roller 15 with reduced friction when the push-pull bars are moving on the rail. By way of example only, rail or rail system 8 may be a piece-wise continuous rail system with a plurality of discontinuous rail-sections, for example rail-section 14 and rail-section 13, supporting a train 52 of the plant-pots; and wherein the discontinuous sections are designed in such a way that the piece-wise continuous rail system 8 is supporting the train 52 of the plant-pots as if the rail system is a continuous rail.

Storage of Plant-Pot

The train of plant-pots are placed on rail 8 in the longitudinal direction. A number of same type of rails are constructed in the vertical direction, on which the train of edamame plant-pots, in this example are stationed. Such vertical array of plant-pots configuration is duplicated in a number of rows in the perpendicular direction. This multi-layer matrix of edamame plant-pots, in this example (by way of example only numerous horizontal rows and six vertical layers of train of plant-pot as may be determined by the interior size of the greenhouse 56), are all placed in the greenhouse 56 on rails of the same configuration as rail 8.

Computer controlled plant-pot mover, smart-arm 16

Figure 3:
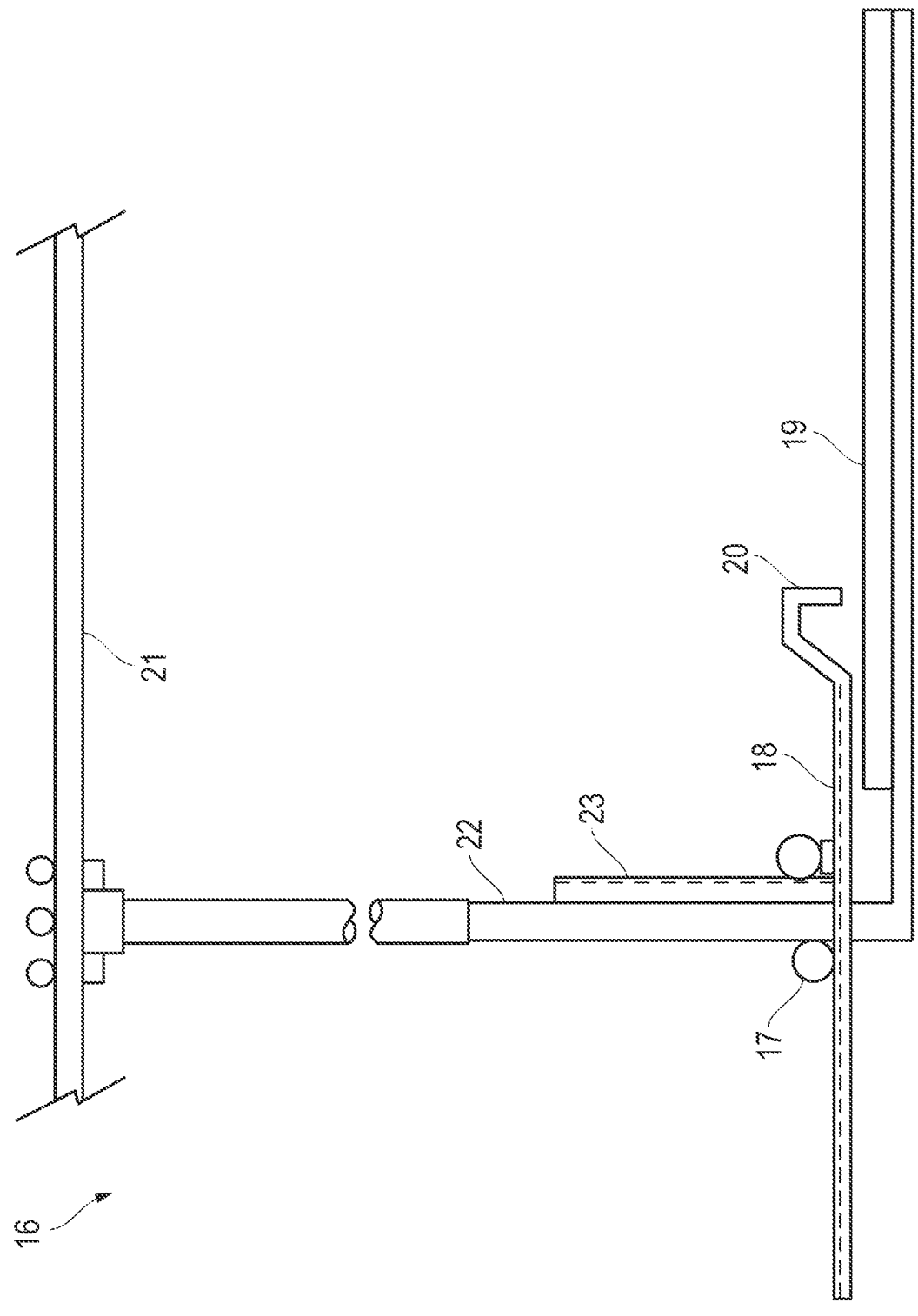
FIG. 3 depicts a side elevational view of an exemplary embodiment of a programmable arm or smart arm.

FIG. 3 depicts a computer controlled smart-arm 16 with, for example, a gear drive motor 17 and gears on gear drive (via motor 17) arm 18 (or in another example represented in FIG. 3A, a hydraulic cylinder 17a, and a hydraulic arm 18a), a plant-pot holder 19, a push-pull hook 20 which is installed at the tip of the gear drive (via motor 17) arm 18 (or hydraulic arm 18a, FIG. 3A). The computer-controlled smart-arm 16 can be programmed to move to any point in space within the pre-defined area in a pre-programed sequence or it can be moved manually to any point. Smart arm 16 is mounted on a mechanism consists of or may comprise, for example, a linear arm moving rail 21, a vertically retractable and rotatable arm 22 with a horizontal retractable and rotatable arm 18 having vertical lifting rail 23. Other variations of mechanism may be employed to achieve the same or similar smart-arm movements, also a hydraulic system may be used to replace the gear drive system as described above (by way of example, as represented in FIG. 3A, a horizontal retractable and rotatable arm 18a having vertical lifting rail 23a; noting, the above-mentioned hydraulic pressure driven mechanisms can be replaced by motor-driven mechanisms using gears and they can also be replaced by mechanisms driven by other means; the reference numbers in FIG. 3A have a lower case "a" inserted after the reference number for components or parts similar or common to FIG. 3).

Smart Arm 16 to Pull Plant Pot Out of the Greenhouse 56.

Figure 4:
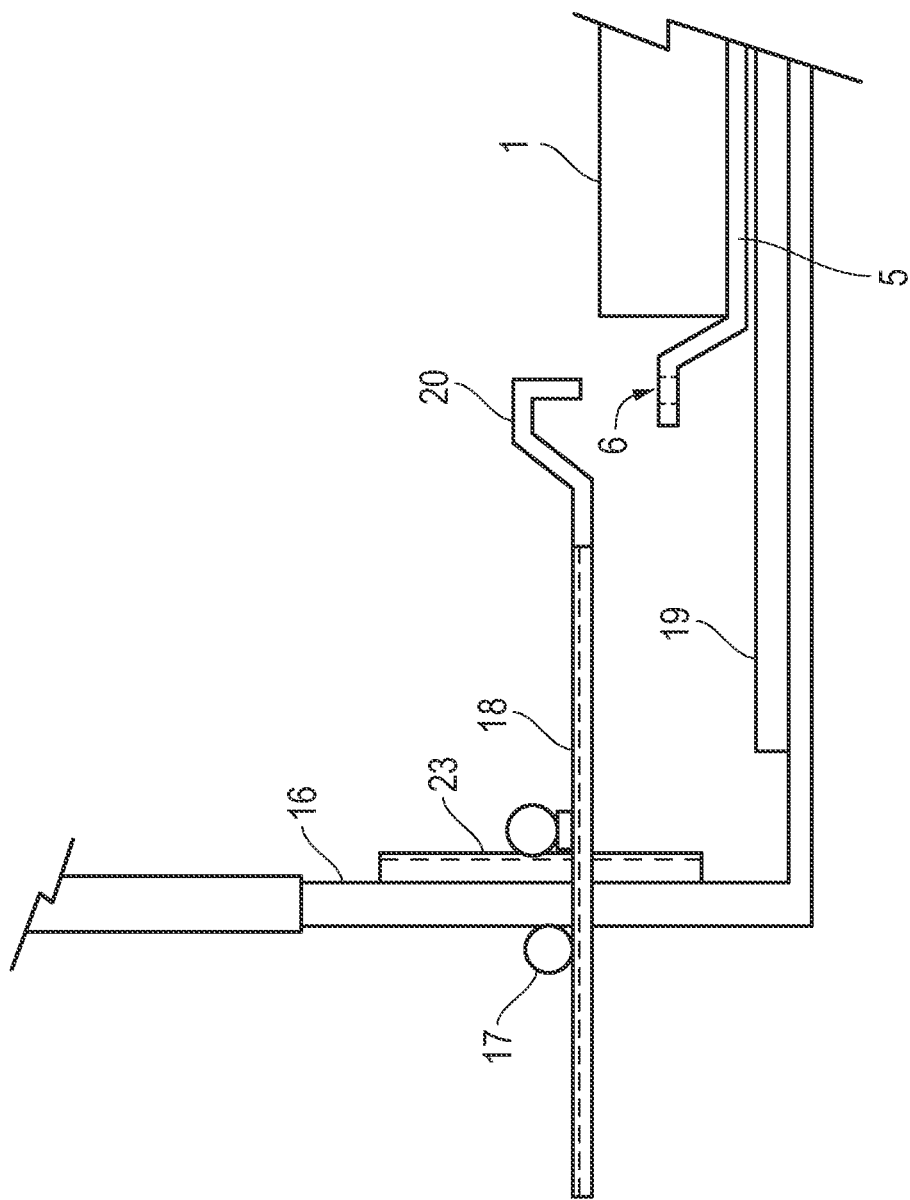
FIG. 4 depicts a side elevational view of an exemplary embodiment of a programmable arm at sequence for removing plant-pot from green house.
Figure 4A:
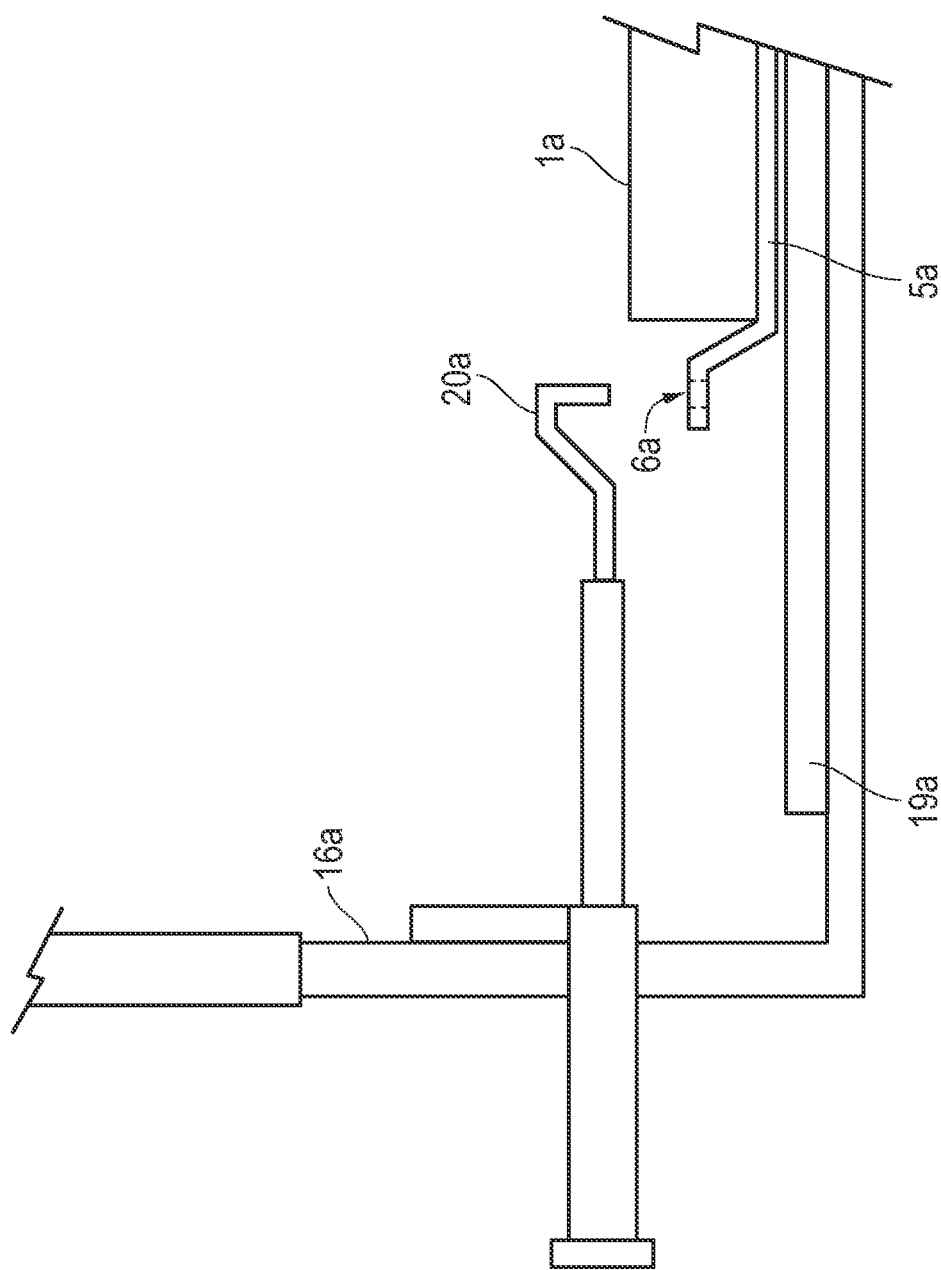
FIG. 4A depicts a side elevational view of another exemplary embodiment of programmable arm at sequence for removing plant-pot from green house.

When the edamame crop is ready for harvest, the smart arm 16 pulls all plant-pots out of the greenhouse 56 in preparation of an automatic harvesting process downstream. With reference to FIG. 4, the smart arm 16 pulls plant-pot 1 out of the greenhouse 56 by inserting the push-pull hook 20 into bar-hole 6 on push-pull bar 5 which is attached to plant-pot 1 (another exemplary embodiment is represented in FIG. 4A; the reference numbers in FIG. 4A have a lower case "a" inserted after the reference number for components or parts similar or common to FIG. 4). The plant-pot 1 is first lifted by smart arm 16 with plant-pot holder 19 supporting plant-pot 1, resulting in the release of bar-hook 7 from bar-hole 11 of the adjacent push-pull bar 10 shown in FIG. 2. The plant-pot 1 is then placed on plant-pot holder 19 to be moved by smart arm 16 to the next harvesting station.

Smart Arm 16 to Place Plant-Pot 1 to Harvest Section

Figure 5:
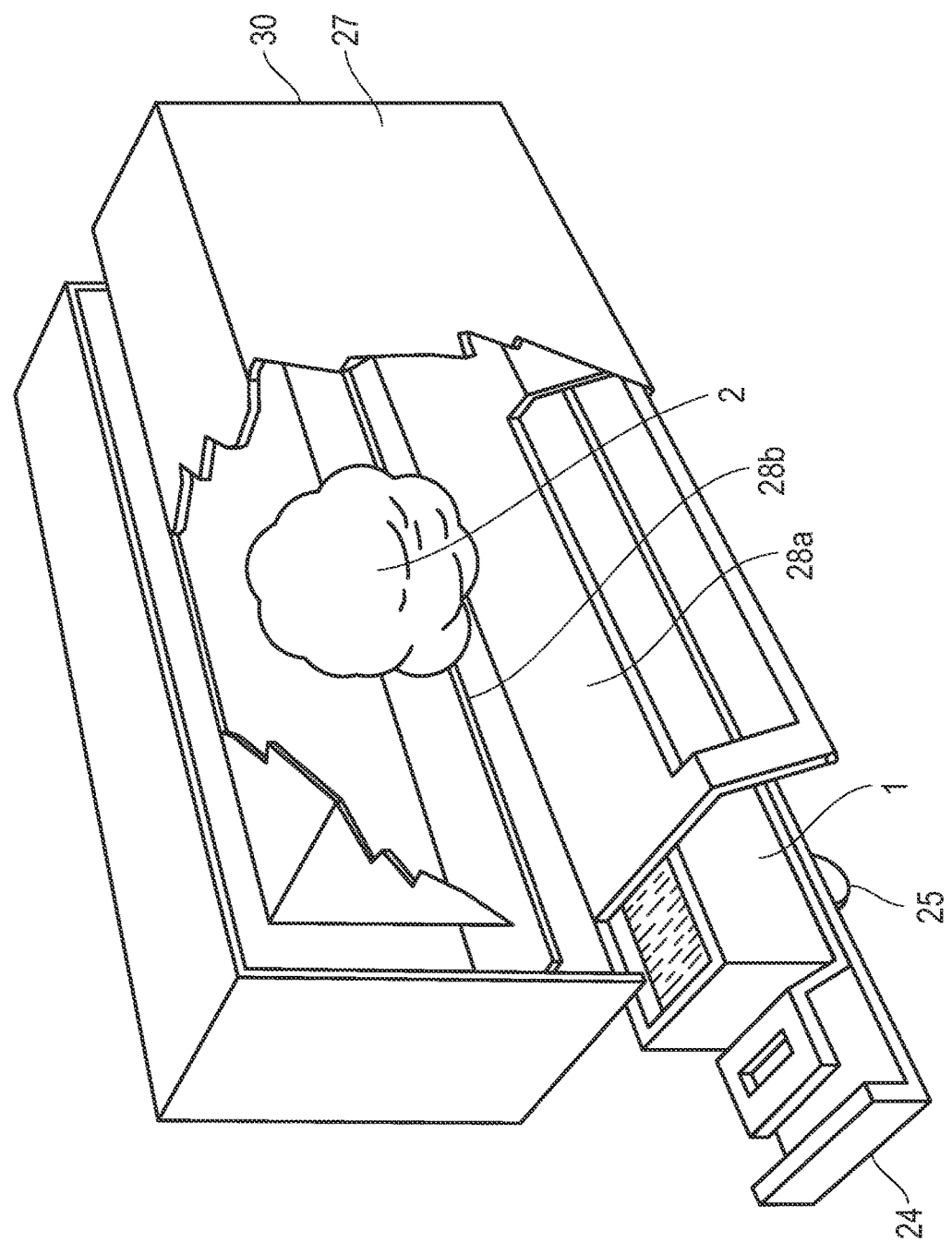
FIG. 5 depicts a partial break-away, perspective view of a plant-pot connected to a plant-pot holder for harvesting of edamame plant.
Figure 6:
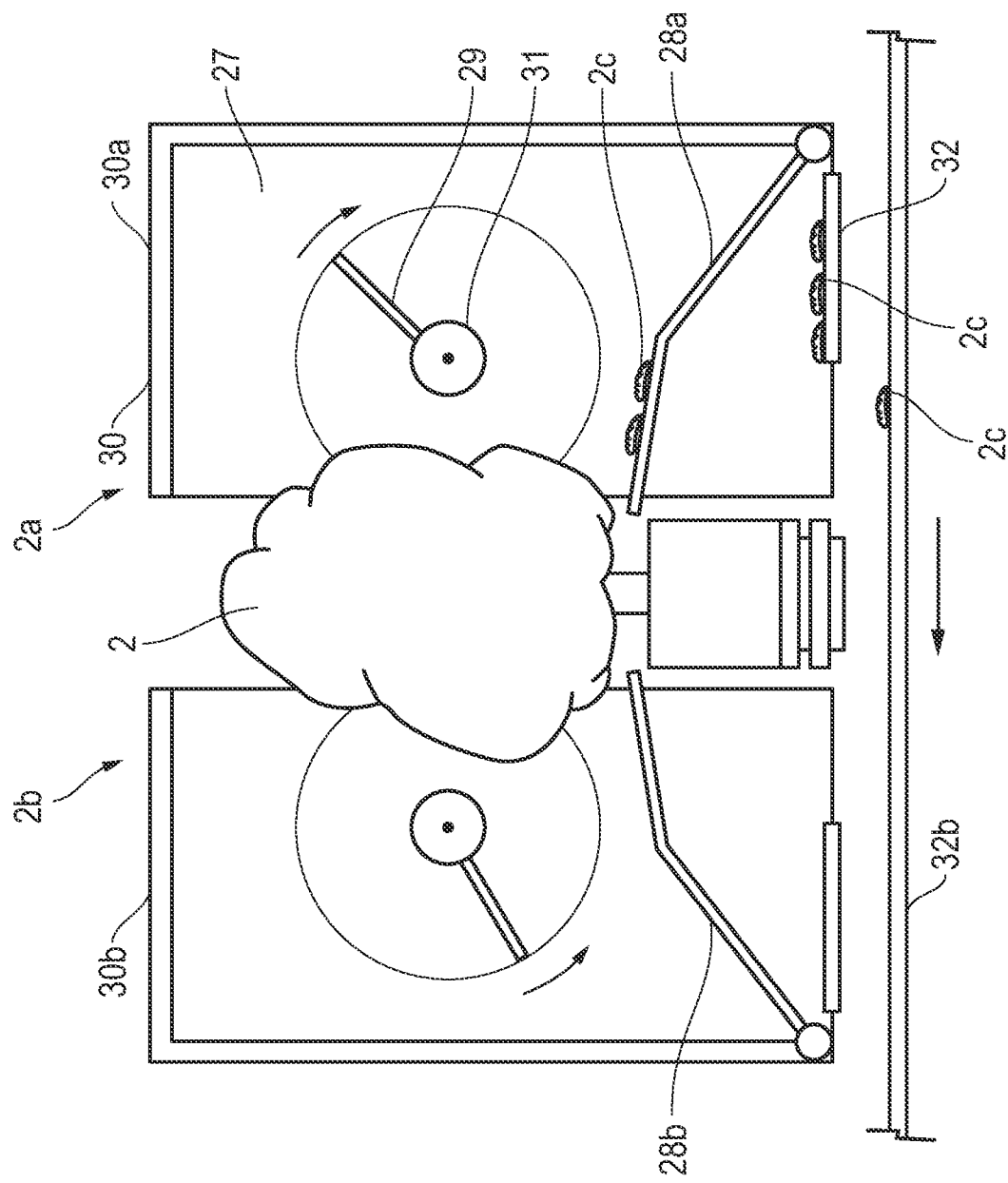
FIG. 6 depicts a front sectional view of harvester box station for harvesting edamame pods from the branches of the edamame plant.

With reference to FIG. 5, the smart arm 16 (not shown but akin to other smart arms shown) pushes plant-pot 1 onto plant-pot holder 24 which uses rotating rollers 25 and 26 (26 not shown) to help move plant-pot 1, while smart arm 16 pushes plant-pot 1 onto plant-pot holder 24. A harvester-box 27 which consists of or may comprise a pair of enclosure 30a, 30b or enclosure 30 then move towards plant-pot 1 and press on the lowest parts of the edamame plants with a pair of clamps 28a, 28b before or after harvester box 27 encloses the edamame plants and to remove the edamame pods from the branches of the plants by means of rotating thin stick 29 which is depicted in FIG. 6. FIG. 6 shows the harvester-box 27 consists of or may comprise numerous rotating thin stick 29 attached to a shaft 31 at one end of the stick. The thin stick 29 can be a rigid stick or a soft stick or a rigid stick covered with a soft material. It can also be a brush with semi-rigid material. The sticks should operate from both sides of the plant 2a, 2b or at least one side of the plant. All with a rigid or loss connection to shaft 31 which can rotate with variable speeds. When shaft 31 turns, the thin stick 29 knocks off the edamame pods from the branches. The shaft 31 can optionally be rotated in either direction so as to minimize breaking-off edamame branches whilst causing the edamame pods or consumer portions 2c of the plant to drop from the plant for harvesting (it may be advantageous to knock the edamame pods from the branches from a top downward direction). The edamame pods or consumer portions 2c being knocked off the branches are confined within enclosure shell 30 which provides openings (shown in FIG. 5 as defined through the clamps 28a, 28b) at the bottom for the edamame to fall through and lands on a conveyor 32b which receives edamame from a second conveyor 32 running normal and above the conveyor 32b as represented in FIG. 6. Conveyor 32 transports the edamame pods to another harvesting system called, in-situ harvesting system for the final sorting, washing, blanching, quick freeze and packaging into sealed bins or retail packs.

Figure 7:
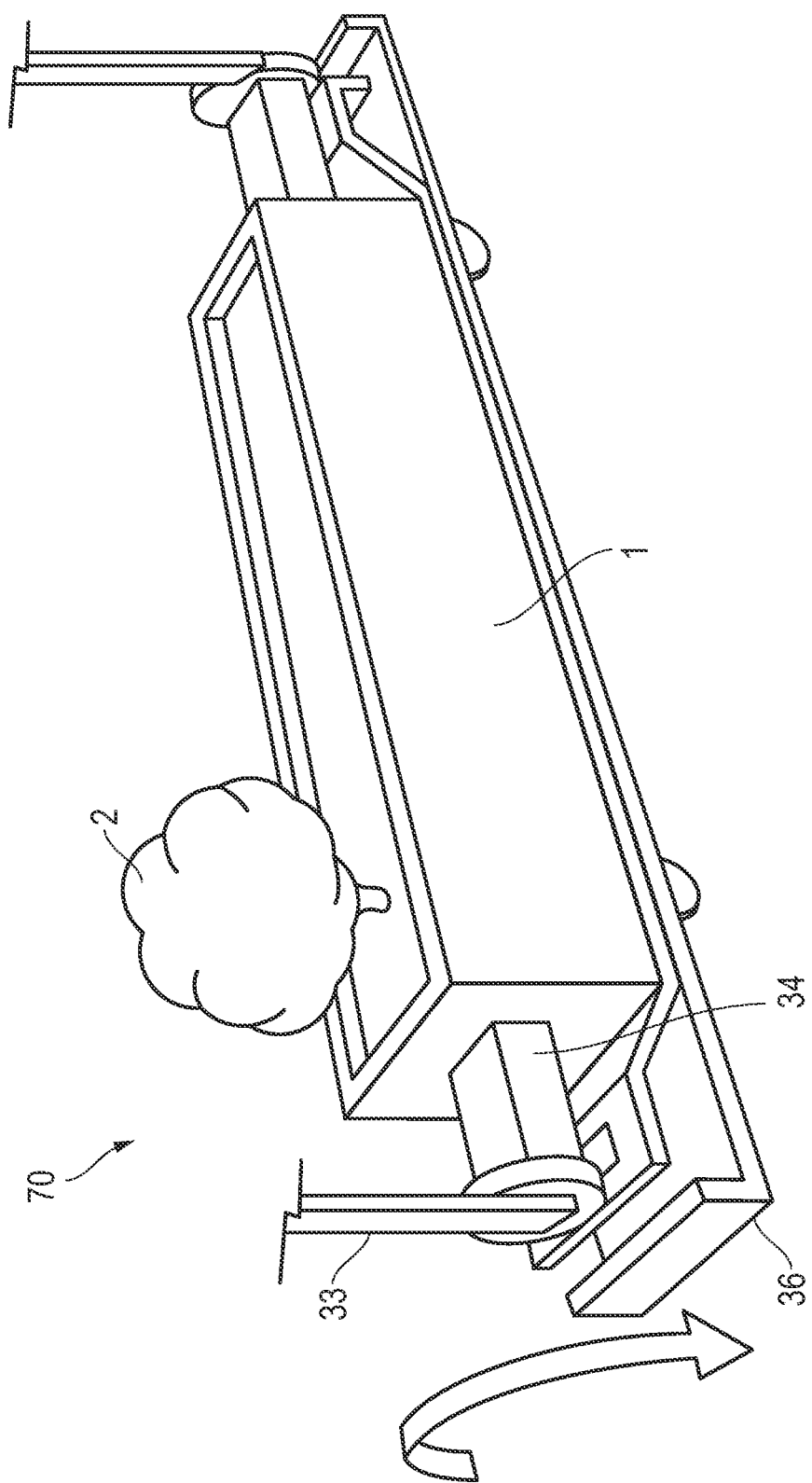
FIG. 7 depicts a perspective view of a plant-pot cleaning, refilling, and sowing station.
Figure 8:
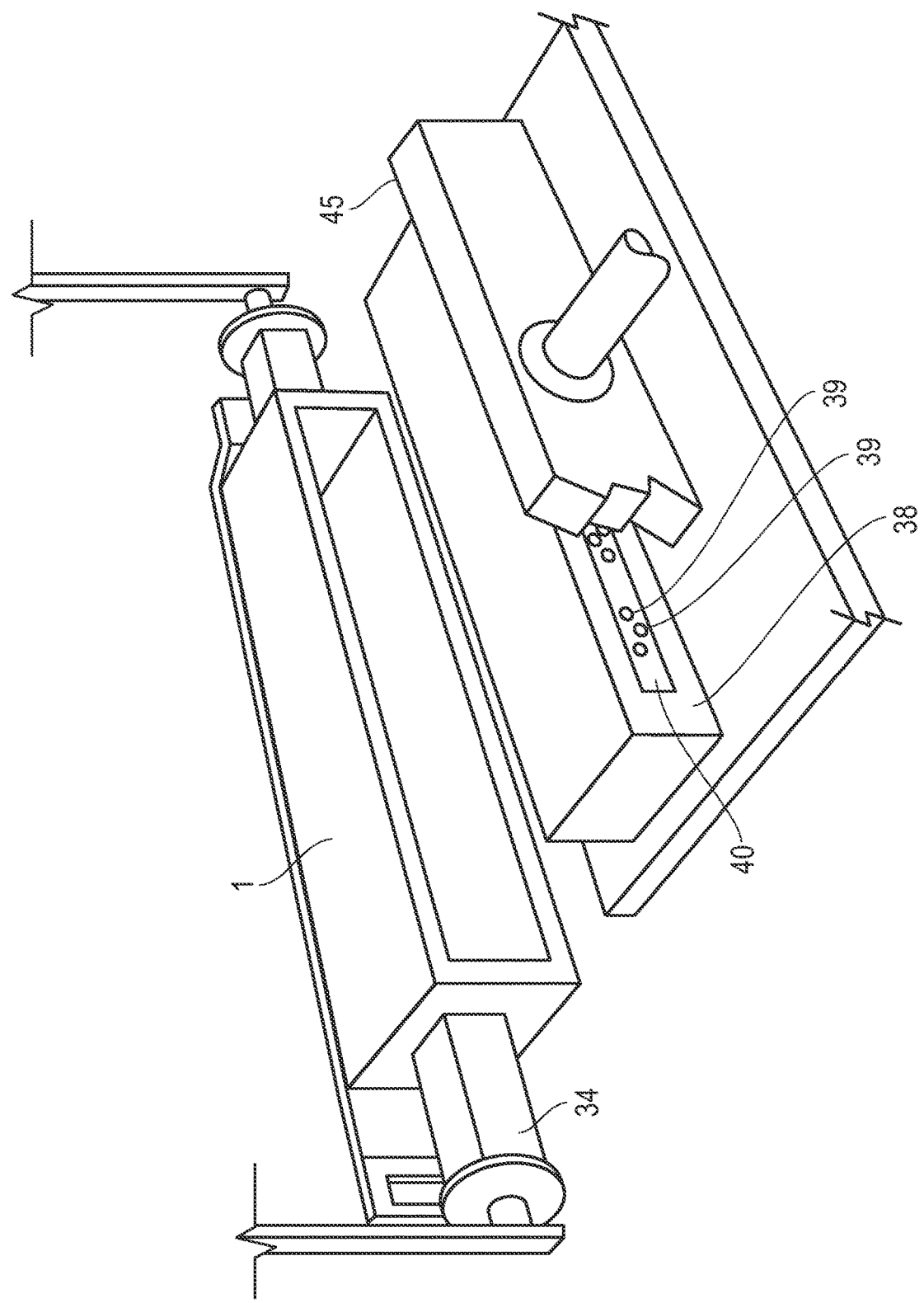
FIG. 8 depicts a partial sectional, perspective view of a plant-pot being refilled and sowed.

Plant-Pot 1 to be Moved to Cleaning, Refill and Sowing Section or Replenish Station 70 after Harvesting Plant-pot 1 is moved by rollers from the harvesting station to the cleaning, refill and sowing station or replenish station 70 where plant-pot 1 is moved onto plant-pot holder 36. FIG. 7 shows plant-pot clamp 33 clamps plant-pot 1 and moves plant-pot 1 away from the plant-pot holder 36. Plant-pot clamp 33 is designed to clamp the plant-pot 1 at its two ends making use of the rectangular cavities, for example, built at the two ends of plant-pot 1, holding plant-pot 1 for cleaning, refill and sowing. Plant-pot clamp 33 is built with a rotating shaft 34 which can rotate up to 360° angle by means of, for example, a step motor. When it turns 180° angle, it rotates plant-pot 1 by 180° angle to face downward for cleaning, if it is so desired. Optionally the plant-pot 1 can be vibrated after rotating by 180° angle to face downward. Plant-pot holder 36 also provides rotating rollers which move plant-pot 1 into the cleaning, refill and sowing station and out of the station as well. After plant-pot 1 is moved out of plant-pot holder 36, a pair of clamps move towards plant-pot 1 and clamp the edamame plants. A downward motion of plant-pot 1 pulls out the edamame plant along with soil. The plants and soil are then dropped into a grinder for grinding into fine pieces to be recycled as a component of future planting soil. It should be noted, the edamame plants can be pull out of the plant-pot 1 when the edamame is facing in the downward direction, if it is so desired. An air jet or water jet is used to clear the residual soil and to clean the plant-pot 1 before the plant-pot 1 is turned 90° angle facing sideway. FIG. 8 shows a column of preformed renewed soil 38 is pushed into plant-pot 1 sideways by means of soil pushing block 45 before the plant-pot 1 is turned additional 90° angles to resume the upward position. The edamame seeds, in this example, are pre-planted in the soil utilizing, for example, a seed sowing tape, it should be noted that, the plant pot 1 can be rotated to other convenient angles for easy cleaning, refill and sowing and the edamame plants can be pulled out of the pot in any other desirable direction. Also shown in FIG. 8 is the abovementioned seed sowing tape to be used optionally where edamame seed 39, for example, is placed underneath the soil surface on the seed sowing tape 40 with pre-determined seed density. Seed sowing tape 40 is easily dissolvable in the soil prior to the seeds being in good contact with the soil after moisture is provided to the tape and the adjacent soil which is in contact with the tape.

Plant-Pot 1 to be Moved to Pick-Up Station

Figure 9:
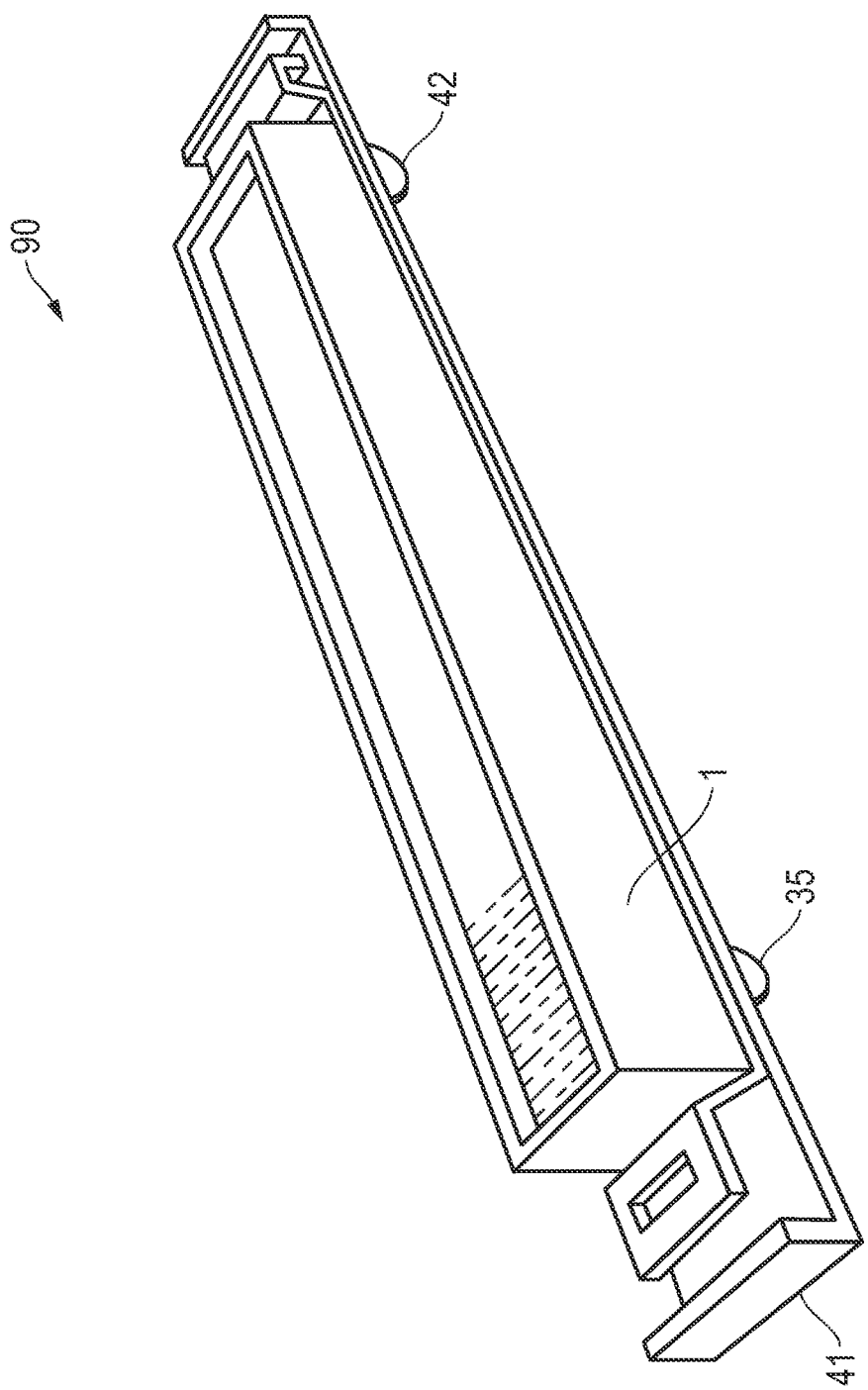
FIG. 9 depicts a perspective view of a plant pot at pick-up station to be moved to reinstall station.

With reference to FIG. 9, the plant-pot 1 is moved out of the cleaning, refill and sowing station and moved onto the plant-pot holder 41 in the pick-up station 90 by the rotating roller 35 and the rotating roller 42 of the plant-pot holder 41.

The mechanical system consisting or comprising of smart arm 16, the harvesting section, the cleaning and seed sowing section as well as the final pick-up section can be built within the same framework to form a collective operating system such that the relative positions between each point in the operating system can be precisely defined in the computer. Such an operating system can simplify the movements of mechanical devises between any two given positions and save the time traveling between the said two positions.

Plant-Pot 1 to be Sent to Reinstall Station 100

Figure 10:
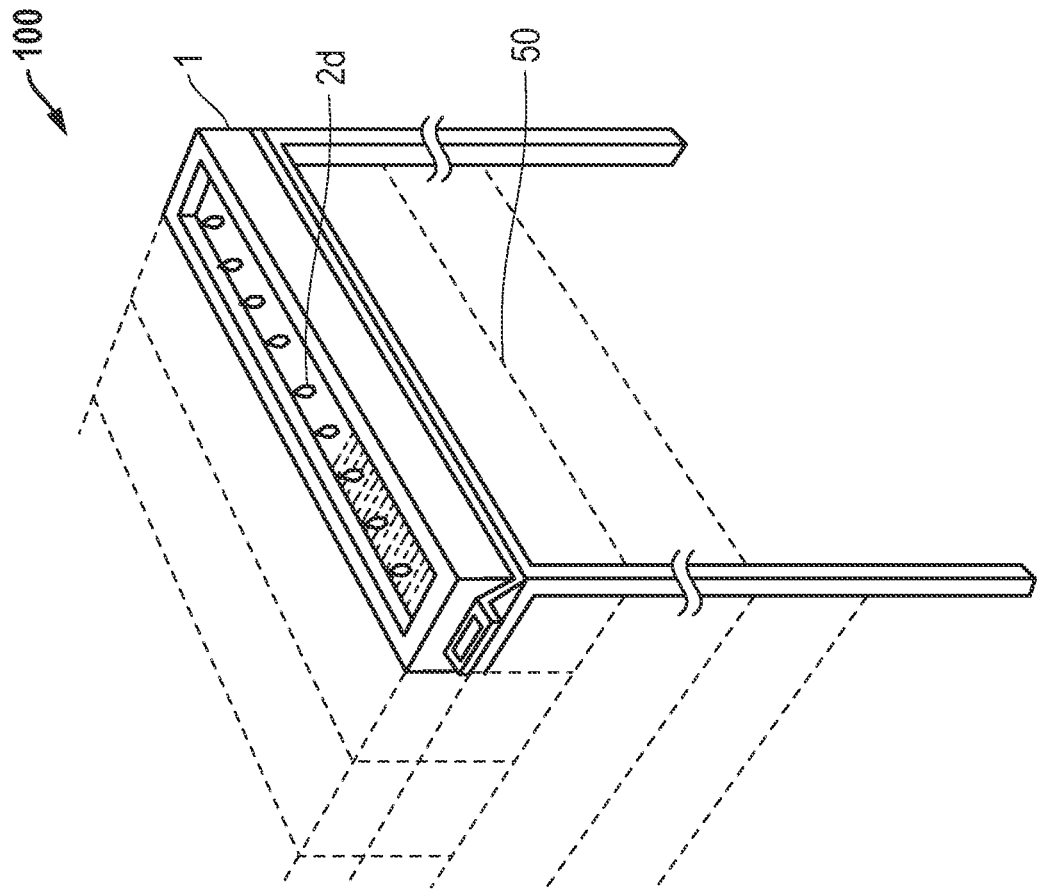
FIG. 10 depicts a perspective view of a plant pot stacked at reinstall station.

With reference to FIG. 10, a smart arm 43 (not shown but akin to other smart arms shown) is used to pick up plant-pot 1 with seed sowing tape 40 from the pick-up station and to stack in the reinstall station 100 waiting for smart-arm 16 or another smart arm, such as smart arm 43 to reinstall it to the green house before or at germination or even after being grown for a period of time beyond germination (for example, reinstall station 100 may have a plant pot 1 that includes young edamame plant(s) 2d. The germination and initial growing of edamame, if any, may be achieved by stacking plant-pot 1 in a temperature-controlled area at the reinstall station 100 inside or outside the greenhouse. Reinstall station 100 may include a rack or racks 50 for stacking multiple plant pots. The reinstall station 100 may be mobile inside the greenhouse and maintains a short distance from the harvesting smart arm 16 station, such that the installation of the new plant pot 1 can be done shortly after the harvesting of the corresponding old plant pot 1. In general, the pant pot being reinstalled is the plant pot being harvested a few days earlier allowing germination and initial growing, if any, prior to reinstallation.

It should be noted that the plant-pot holders with rollers may be eliminated, if the plant pots and the framework which is in contact with the plant pots are made of materials of low coefficient of friction.

Timing Considerations and Multiple Mechanical Duplication

In order to speed up the entire process, some processing mechanisms may be duplicated, split, or bifurcated to catch up the processing flow. As an example, if it takes 1 minute to accomplish the first stage processing, namely, to pick up the plant-pots by smart-arm 16 from the greenhouse 56 and move the plant-pot to the harvesting station and it takes 2 minutes at the best speed to accomplish the harvesting process, then 2 identical or equivalent harvesting mechanisms shall be used (i.e. duplicated) to speed up the harvesting process to constitute a continuous flow of processing at 1 minute per plant-pot removal from the greenhouse 56 and 1 minute per harvesting as well. In this case, the smart arm 16 shall move the plant-pots to the 2 harvesting mechanisms sequentially. If for example, it takes 2 minutes and 20 seconds at the best speed to accomplish the harvesting process, then 3 identical or equivalent harvesting mechanism shall be used to constitute the same processing flow of 1 minute per plant-pot.

Continuous harvesting, continuous processing by each individual processing station (including cleaning, refilling, sowing, and returning the renewed pot as part of a renewed row for growing) is advantageous to the overall processing of the indoor enclosure 54 or indoor plant production and harvesting facility such as a greenhouse 56. Harvesting is carried out on a continuous and sequential basis which is very advantageous to the system. Harvesting may or should occur according to when individual plants are mature for sequential (e.g., one after another, via maturity, and automatic) and continuous harvesting. In turn, planting and other processing follows the same pattern (e.g., continuous and sequential) such that overall planting, processing, harvesting, etc. is continuous and sequential by maturity of plants 2 in plant-pots 1. It should be noted, smart arm 43 or other smart arm may be used to re-install the renewed plant-pot with new soil and seeds back into the green house, so that smart arm 16 can perform the abovementioned first stage processing continuously for all plant-pots in the greenhouse 56.

WORKING EXAMPLE

Figure 11:
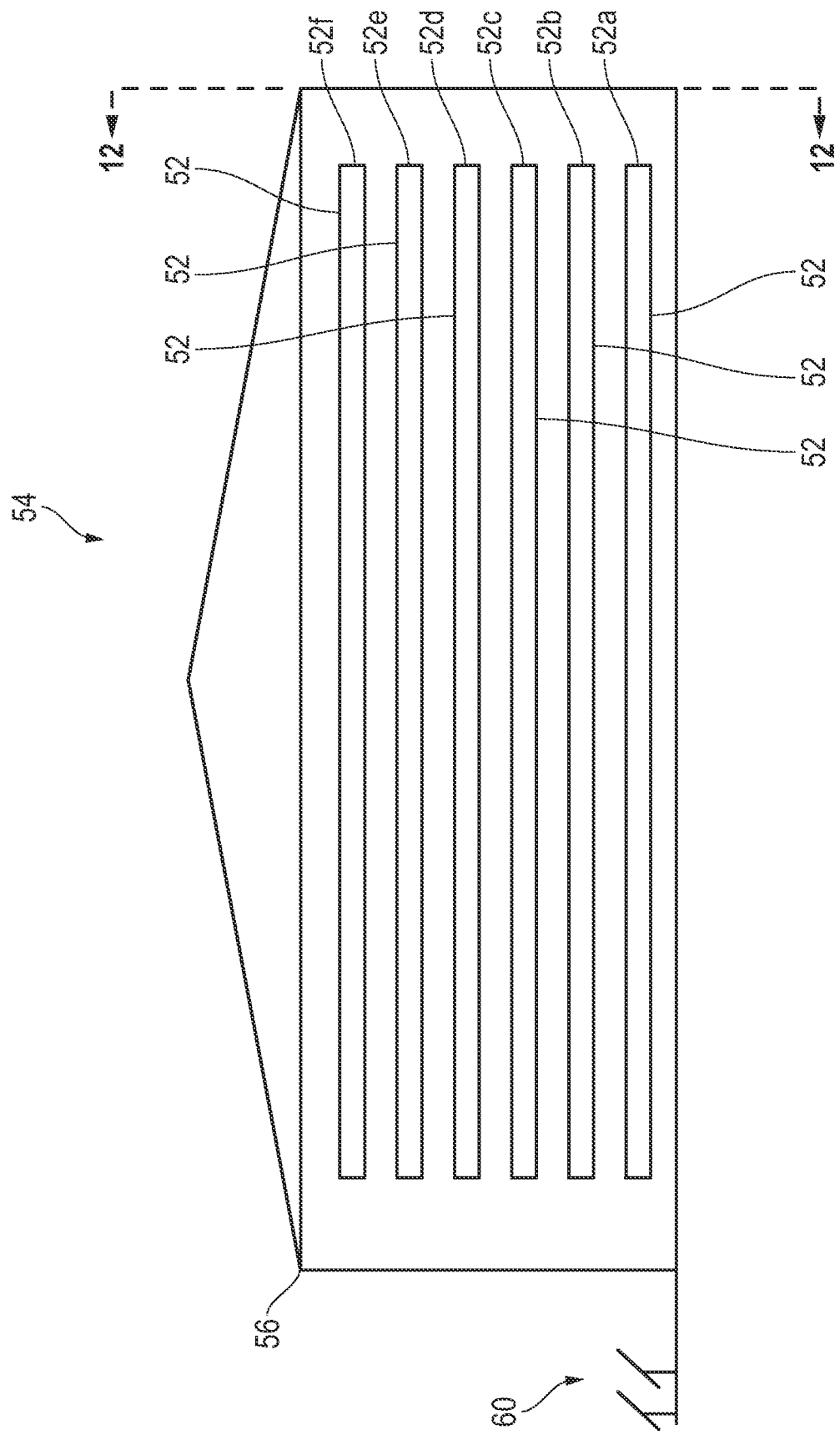
FIG. 11 depicts a schematic, side elevational view of a greenhouse or indoor enclosure having six levels of trains and showing an end train of each of the six levels of trains.
Figure 12:
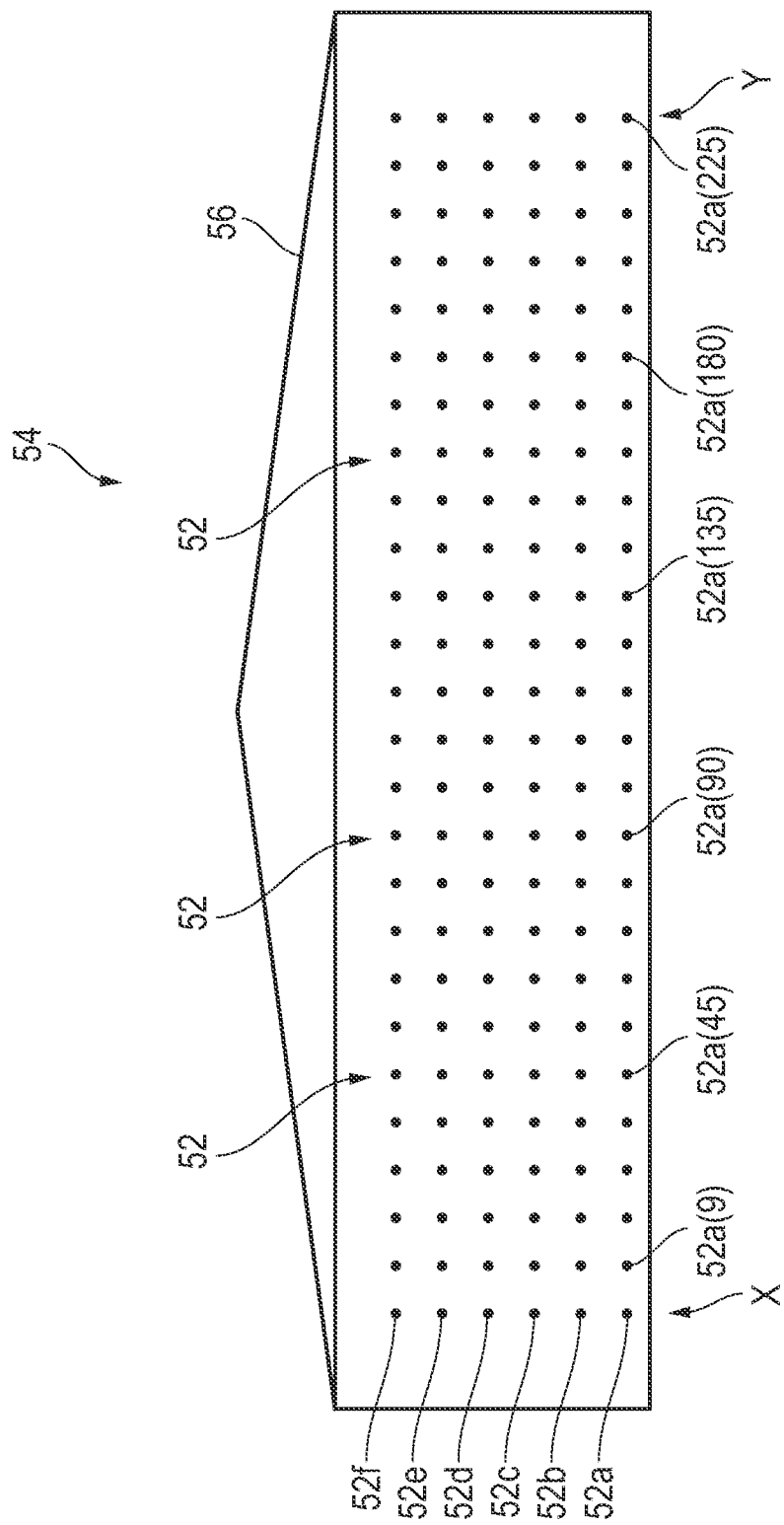
FIG. 12 depicts a sectional, schematic, end elevational view of the greenhouse or indoor enclosure of FIG. 11, and schematically showing trains per each of the levels or layers of trains.

In one working example of an indoor plant production facility and referring generally to FIGS. 11-12, each plant-pot 1 and/or 9 (not shown in FIGS. 11-12 but shown in other figures) may have fifteen (15) plants, each train 52 of plant-pots may have twenty (20) plant-pots 1 and/or 9 (not shown in FIGS. 11-12 but shown in other figures), the facility or indoor enclosure 54 or greenhouse 56 may have in one exemplary embodiment two hundred and twenty-five (225) trains 52 of plant-pots spaced across each horizontal layer and the facility may have six (6) separate vertical layers 52*a*, 52*b*, 52*c*, 52*d*, 52*e*, and 52*f*. The source of energy for the facility may be solar energy which may be provided by solar array(s) 80. FIG. 11 shows a schematic side view of an end train 52 for each of six layers or levels of trains 52*a*, 52*b*, 52*c*, 52*d*, 52*e*, 52*f* of trains 52, wherein each layer or level of trains is oriented or spaced vertically from another or with respect to another layer or level of trains. Each train layer 52*a*, 52*b*, 52*c*, 52*d*, 52*e*, and 52*f* is located in an indoor enclosure 54 such as a greenhouse 56. A source of energy for the greenhouse 56 may be provided by solar arrays 80. FIG. 12 shows a sectional, schematic, side view of the greenhouse 56 or indoor enclosure 54 of FIG. 9, and schematically shows two hundred twenty-five trains 52 per each of the six levels or layers of trains 52*a*, 52*b*, 52*c*, 52*d*, 52*e*, 52*f*. Two hundred twenty-five trains 52 may be located or spaced apart horizontally along the first train layer or level 52*a*. For example, trains 52 may be spaced from one end X of train level 52*a* to another end Y of train level 52*a*. Schematically, each symbol or marking extending from one end X of train level 52*a* to another end Y of train level 52*a* represents trains lined up such that nine trains are spaced from each symbol or marking to the next. The number of trains represented in the schematic drawing on level or layer 52*a* as arranged from one end X of train level 52*a* to another end Y of train level 52*a* are indicated in parenthesis, e.g., 52*a*(9) indicates 9 trains, 52*a*(45) indicates 45 trains, 52*a*(90) indicates 90 trains, 52*a*(135) indicates 135 trains, 52*a*(180) indicates 180 trains, 52*a*(225) indicates 225 trains.

It is to be understood that the teachings and disclosure of U.S. patent application Ser. No. 18/072,342, filed Nov. 30, 2022; and of U.S. provisional patent application Nos. 63/303,272 and 63/341,662 respectively filed Jan. 26, 2022 and May 13, 2022 are hereby incorporated by reference herein.

It is understood that the present disclosure is not limited to the particular applications and embodiments described and illustrated herein, but covers all such variations thereof as come within the scope of the claims. While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An apparatus for mass indoor production of a plant within a greenhouse, comprising:
   at least two rail-sections collectively forming a rail;
   at least two push-pull bars are on the rail-sections;
   at least two pots mounted on the respective two push-pull bars;
   a linear arm moving rail:
   a vertical retractable and rotatable arm connected to the linear arm moving rail;
   a horizontal retractable and rotatable arm connected to the vertical retractable and rotatable arm:
   wherein the two push-pull bars include a linkage for joining contiguous and aligned push-pull bars; and
   wherein the linkage comprises the two push-pull bars having a bar-hole at one end and a bar-hook at another end for joining the contiguous and aligned push-pull bars.

2. The apparatus according to claim 1, further comprising at least two additional push-pull bars are on the rail-sections and in a contiguous and aligned row in parallel to the two push-pull bars; at least four more push-pull bars mounted vertically in an upper-lower relationship with respect to the two push-pull bars and the two additional push-pull bars; at least two additional rail-sections collectively forming a rail and mounted below the four more push-pull bars; and at least additional two pots mounted on the respective two additional push-pull bars.

3. The apparatus according to claim 2, further comprising a harvester enclosure comprising two opposing clamps for mounting above one of the pots; two overlapping enclosure-shells one each connected to the two opposing clamps; two rotatable shafts, one each mounted in one of the respective overlapping enclosure-shells; multiple sticks on at least two sides of the plant; and a conveyor mounted below openings through the clamps.

4. The apparatus according to claim 3, further comprising a second conveyor mounted below and normal to the conveyor mounted below the openings through the clamps.

5. The apparatus according to claim 4, further comprising a replenish station comprising two clamps for connecting to one of the pots; and a rotating shaft for adjoining to the two clamps and for connecting to one of the pots.

6. The apparatus according to claim 5, further comprising a volume of preformed soil; a plurality of seeds for planting in the volume of preformed soil; and a slidable push block for pressing the volume of preformed soil into one of the pots.

* * * * *